W. J. ANDREWS.
PLAYING CARDS.
APPLICATION FILED MAY 5, 1917.
1,284,209.
Patented Nov. 12, 1918.
2 SHEETS—SHEET 1.
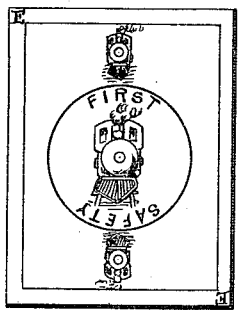
Fig. 1.
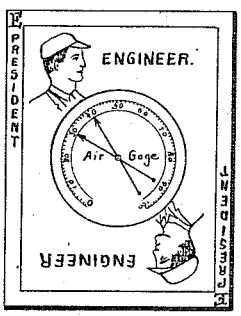
Fig. 2.
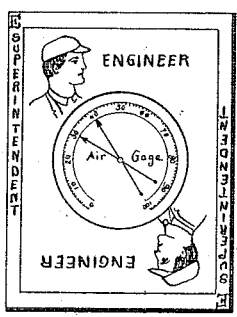
Fig. 3.
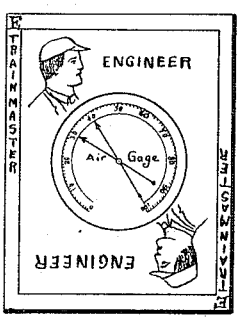
Fig. 4.
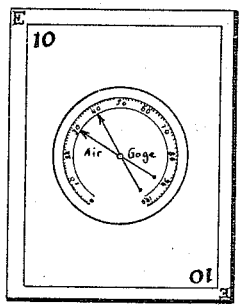
Fig. 5.
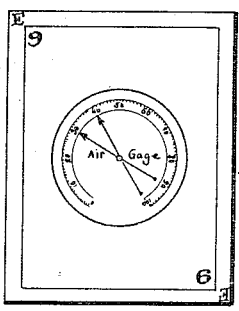
Fig. 6.
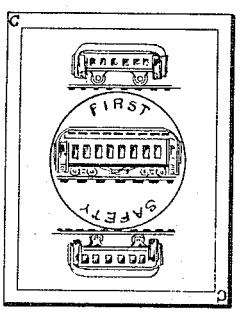
Fig. 7.
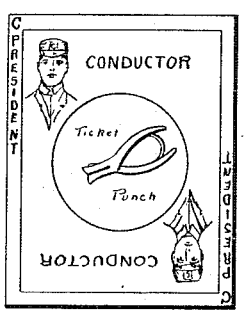
Fig. 8.
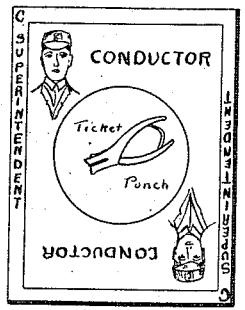
Fig. 9.
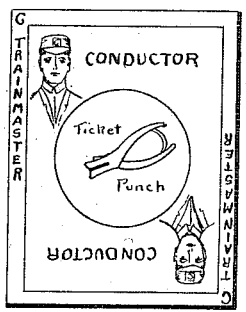
Fig. 10.
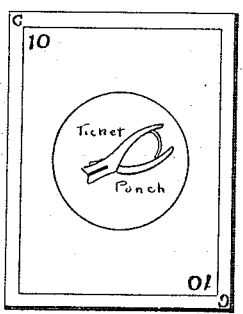
Fig. 11.
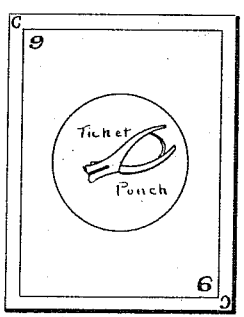
Fig. 12.
Fig. 13.
WITNESSES
INVENTOR
William J. Andrews,
BY
ATTORNEY W. J. ANDREWS.
PLAYING CARDS.
APPLICATION FILED MAY 5, 1917.
1,284,209.
Patented Nov. 12, 1918.
2 SHEETS—SHEET 2.
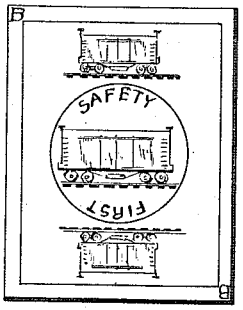
Fig. 14.
Fig. 15.
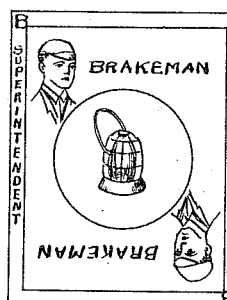
Fig. 16.
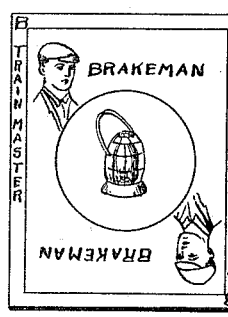
Fig. 17.
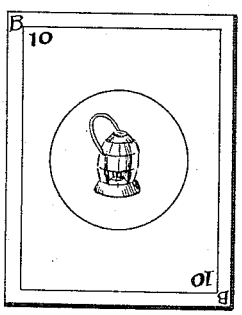
Fig. 18.
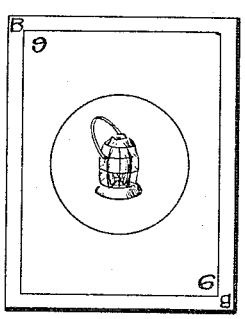
Fig. 19.
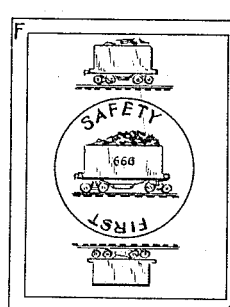
Fig. 20.
Fig. 21.
Fig. 22.
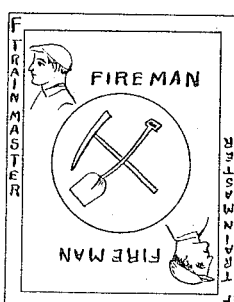
Fig. 23.
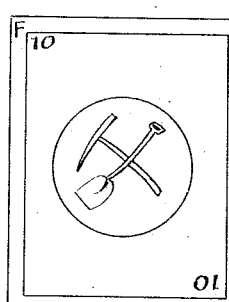
Fig. 24.
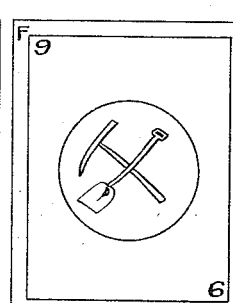
Fig. 25.
Fig. 26.
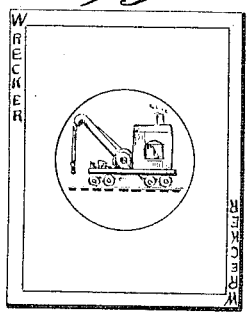
WITNESSES
INVENTOR
William J. Andrews
BY
ATTORNEY

UNITED STATES PATENT OFFICE.

WILLIAM J. ANDREWS, OF COLUMBIA, TENNESSEE.

PLAYING-CARDS.

1,284,209.

Specification of Letters Patent.

Patented Nov. 12, 1918.

Application filed May 5, 1917. Serial No. 166,689.

*To all whom it may concern:*

Be it known that I, WILLIAM J. ANDREWS, a citizen of the United States, residing at Columbia, in the county of Maury and State of Tennessee, have invented certain new and useful Improvements in Playing-Cards, of which the following is a specification.

This invention relates to card games and has for its primary object to provide an improved game which shall be simple and easily learned or understood, and which will prove highly interesting and instructive.

With these objects in view, together with others which will appear as the description proceeds, the invention resides in the novel combination of cards to be hereinafter described, illustrated in the drawings and pointed out in the claim.

In the drawings:

Figure 1 is a face view of one of the high cards of the deck,

Figs. 2, 3 and 4 are similar views of the next highest cards in order, respectively.

Figs. 5 and 6 are similar views of two of the cards of one suit.

Figs. 7, 8, 9, 10, 11 and 12 are views similar to those above described, and illustrating cards corresponding in value constituting another suit of the deck.

Fig. 13 is a face view of one of the cards independent of any suit.

Figs. 14, 15, 16, 17, 18, and 19, are face views of the face cards of another suit.

Figs. 20, 21, 22, 23, 24 and 25 are face views of still another suit, and

Fig. 26 is a face view of another card independent of any suit.

The present game has the cards of its various suits, as well as the cards independent of the suits, designed to represent certain branches or occupations of railroading, the principal branches only of such occupation being shown and described. The high cards of the various suits are illustrated in Figs. 1, 7, 14, and 20, and these cards have higher values than other cards of their respective suits. These high cards, in the present instance, are inscribed "Safety first", and the card illustrated in Fig. 1 is the high card of the "engineer" suit; the card illustrated in Fig. 7 of the "conductor" suit; the card illustrated in Fig. 14 is of the "brakeman" suit; and the card illustrated in Fig. 20 is of the "fireman" suit. These cards bear representations of some element or instrumentality associated with the particular branch of railroading to which it belongs; as for instance the high card of the "engineer" suit bears a picture of a locomotive; the high card of the conductor suit bears the representation of a passenger coach; the high card of the brakeman suit bears the picture of a freight car; and the high card of the fireman's suit bears the representation of a coal car.

The next high cards of the "engineer" suit are illustrated in Figs. 2, 3, 4, 5 and 6, the first three of which will be referred to as "face" cards, while the remaining two will be termed number cards. The face cards have represented thereon a dial with indicating fingers, being the representation of the air gage for a locomotive and the face cards are illustrated with the representation of the head of an engineer. The numbered cards of this particular suit bear numbers successively from "10" to "2", and each has the representation of an air gage, the initial "E", to identify it with the engineer's suit, the number denoting its value, and is devoid of the picture of the engineer.

The face cards of the "engineer" suit vary in value, and to distinguish these cards, they are entitled. The card which ranges in value next to the "safety first" or highest value card, is termed "president"; the next high card is termed "superintendent"; while the lowest in value of the face cards is termed "trainmaster".

The face cards of the various suits bear the same representative values to their "high" or "safety first" cards as those explained in the description of the "engineer" suit, and are entitled "president", "superintendent" and "trainmaster", respectively. The face cards of the "conductor" suit bear the illustration of a ticket punch and the head of a railroad conductor; the face cards of the "brakeman" suit bear the representation of a signaling lantern and the head of a brakeman, while the face cards of the "fireman" suit have inscribed thereon the crossed coal pick and shovel together with the head of a fireman. All of the cards of the various suits have the first letter of the name of the suit to which they belong printed or stamped in certain of their corners so that the various cards may be readily identified.

In Fig. 13 of the drawings, there is illustrated a card which is independent of any suit, and which is adapted to be used in playing the game to add points or counts or advantages to the player receiving or holding the same. This card is termed the "dispatcher", and has inscribed thereon the representation of telegraph poles and a signaling apparatus.

In Fig. 26 there is illustrated another card independent of any suit, and which also possesses a greater or less relative value. This card is entitled the "wrecker", and bears the picture of a wrecking car used in railways.

It will be understood that the value of the cards of the various suits decrease from the high or "safety first" card down to "2", and these cards may have varying values. For instance, the "safety first" card may count one point for game; the "president" card three for game; the "superintendent" two for game; the "trainmaster", one point and one for game; the "dispatcher" one point; the "wrecker" fifteen for game; the "10" five for game; the "2" one point, while the cards between the "2" and "10" count for nothing.

The method of playing the game may be described as follows:

The cards fifty-four in number, are shuffled and dealt to the various players. Each player receives six cards, and the players bid upon their hands in rotation. Each player, of course, will bid upon the suit of which he has the most high value cards, and will endeavor to make such suit "trump."

The player bidding the highest number of points may then make the trump, whereupon all of the players discard such of the cards they hold which are not "trumps". The dealer then deals to each player a number of cards sufficient to bring their holding to a total of six cards. Now if any player holds the "dispatcher" card, he may change the bid to trump such suit as he may desire, provided that he bid more points than the player who made the trump in the first instance. When the hand is played, if it should be found that the holder of the "dispatcher" card has failed to make the points he has bid, he has deducted from his score the number of points which he bid, as well as the number of points which the original trump maker had bid. In such instance, the original trump maker has applied to his score the total number of points that were made in the game. If the holder of the "dispatcher" card gains the points he bid, these points are, of course, applied in his favor. Those of the players who hold the various cards at the end of the hand may have points or counts for game applied in their favor, and the relative values of the cards so held may be varied. The "dispatcher" card will take any card from "trainmaster" down and counts one point and is always trump. The "wrecker" card is also at all times trump and will take any card from the "dispatcher" down.

From this description it is apparent that I have provided an extremely simple and highly instructive, entertaining and amusing game, and one which is capable of being quickly and easily learned, and may be played by various numbers of persons.

It will be understood that variations in the design, number of cards, manner of playing and counting may be liberally made without departing from the spirit of the invention as defined by the appended claim.

What is claimed is:

Playing cards constituting a deck divided into suits and the cards of each suit varying in their relative values, the highest card of each suit being inscribed "Safety first"; the next three cards of each suit being inscribed "President", "Superintendent", and "Trainmaster" respectively, and a pair of additional cards for the deck being named "Dispatcher" and "Wrecker" respectively and being of greater value than the highest cards in said suits.

In testimony whereof I affix my signature in presence of two witnesses.

WILLIAM J. ANDREWS.

Witnesses:
GEO. T. HUGHES, Jr.,
ANNIE DAVIS.

Copies of this patent may be obtained for five cents each, by addressing the "Commissioner of Patents, Washington, D. C."